United States Patent [19]

Zebuhr

[11] Patent Number: 4,658,760
[45] Date of Patent: Apr. 21, 1987

[54] PRESSURE TRANSFER FLUID HEATER
[75] Inventor: William H. Zebuhr, Nashua, N.H.
[73] Assignee: American Thermal Corporation, Nashua, N.H.
[21] Appl. No.: 745,444
[22] Filed: Jun. 17, 1985
[51] Int. Cl.[4] ............................................. F22B 5/00
[52] U.S. Cl. ................................. 122/13 R; 126/362; 137/625.66; 222/249
[58] Field of Search ............................. 222/249, 250; 137/625.66; 122/13 R, 14, 15, 406 R; 126/361, 362

[56] References Cited

U.S. PATENT DOCUMENTS 3,216,627 11/1965 Best et al. .............................. 222/249
3,552,606 1/1971 Kraft et al. ............................ 222/249
4,557,252 12/1985 Dinh .
4,566,491 1/1986 Aiuola et al. .................... 222/249 X
4,590,992 5/1986 Tamblyn .

Primary Examiner—Edward G. Favors
Attorney, Agent, or Firm—Cesari and McKenna

[57] ABSTRACT

A device for transferring pressure from one fluid stream to another utilized in conjunction with a storage vessel where fluid is stored at ambient pressure and a desired temperature. An entering fluid stream at another temperature is introduced to the device under pressure and the energy of the fluid stream is utilized to pump a second fluid stream of approximately the same flow and pressure from the vessel. The entering fluid flows into the vessel at approximately ambient pressure at its original temperature where it replaces the removed fluid.

12 Claims, 2 Drawing Figures

PRESSURE TRANSFER FLUID HEATER

BACKGROUND AND SUMMARY OF THE INVENTION

A standard domestic water heater for home or small commercial use consists of a pressure tank containing water at line pressure (20 to 100 psi) and a heating device. The heating device can be an electric element gas or oil burner or heat exchanger transferring heat from another source.

The pressure tank provides sufficient storage of heated water to satisfy peak demands. The heating device will not transfer heat fast enough to satify most demand rates but given sufficient time will bring the water in the tank back to the desired temperature.

The vast majority of pressure tanks are made of steel and protected from corrosion by a glass or cement lining. The corrosion protection is not complete and the life of a typical tank is about 10 years. The tank must withstand the line pressure safety and steel is the lowest cost way of getting the required structure.

Tanks can be made much less expensively if they contain water at ambient (atmospheric) pressure. The present invention allows the line pressure to be transferred from the entering cold water stream to the leaving hot water stream without imposing this pressure on the walls of the tank. The pressure is contained in 2 small vessels with a combined volume that may be much less than one percent the volume of the tank. These vessels are constructed so that one can be filled with the heated water while the other discharges its contents to the hot water line and vise versa. They are cyclically operated by the pressurized entering fluid stream.

By this mechanism the line pressure can be contained in a small device utilizing minimum materials while the heated volume of water is contained in a low cost tank at ambient pressure.

DESCRIPTION OF THE PREFERRED EMBODIMENT

Figure 1:
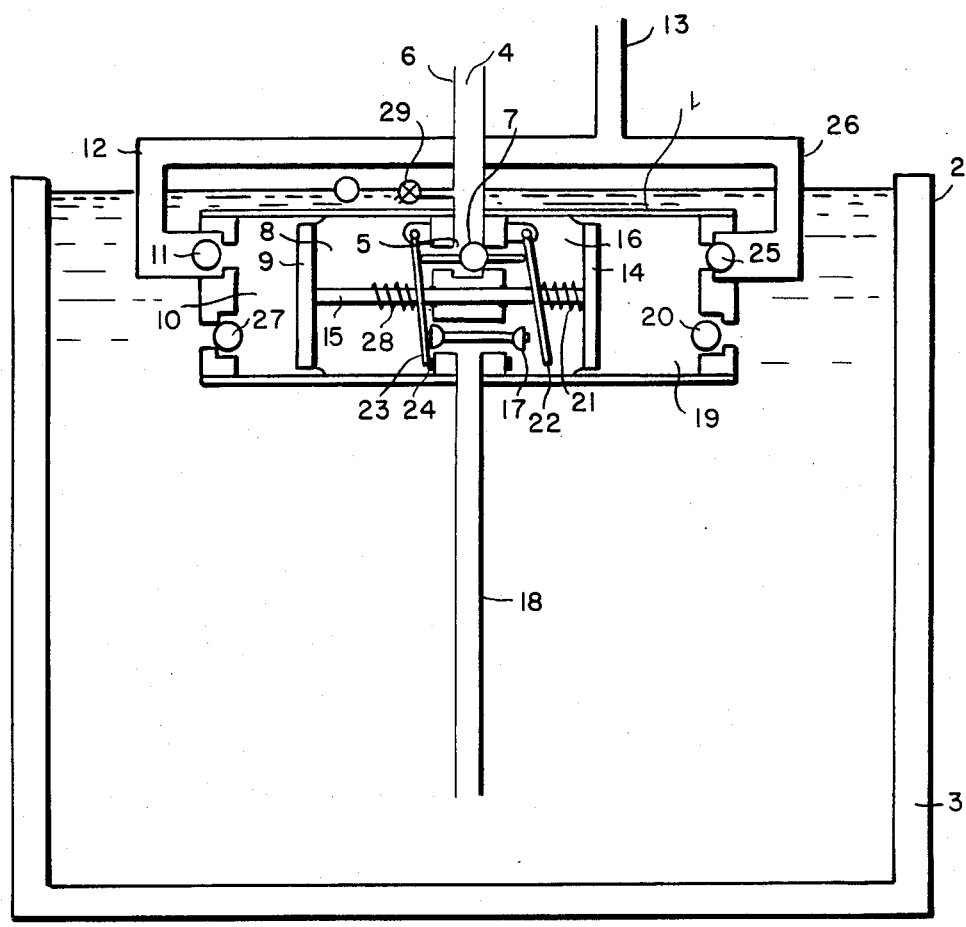
FIG. 1 is a modified sectional view of the complete system excluding elements not necessary for discussion.

The system consists of the pressure transfer mechanism (PTM)1, and storage vessel 2. The PTM is a fluid driven pump. Tank 2 contains a fluid 3 at temperture T1.

Fluid 4 at temperature T2 and pressure P enters valve chamber 5 via pipe 6, valve 7 is positioned such that fluid 4 enters chamber 8 at nominal pressure P driving piston 9 to the left and driving the fluid in chamber 10 past check valve 11 into pipe 12 to pipe 13. Piston 14 connected to piston 9 by rod 15, also moves left driving the fluid in chamber 16 past valve 17 and into the bottom of tank 2 via pipe 18. Piston 14 also draws fluid from tank 2 into chamber 19 via check valve 20.

The fluid in chamber 12 is at nominally ambient pressure due to the open connection to tank 2. The fluid in chamber 19 is also at nominally ambient pressure due to the open connection to tank 2 and is at a temperature T1. The fluid in chamber 8 is at temperature T2.

As piston 14 moves to the left it engages spring 21 and in turn lever 22. Lever 22 forces valve 7 to the left and with it lever 23. Lever 23 is held in position by magnet 24 and is released from the magnet by valve 7. As soon as it is released spring 21 exerts full force on valve 7 overcoming the fluid pressure against it and drives it across chamber 5 to the opposite seat. Upon partial movement of valve 7 lever 22 engages valve 17 and also moves it to its opposite seat.

Movement of valves 7 and 17 by the action of piston 14 causes fluid in at pressure P and temperature T2 to enter chamber 16 and allows the fluid in chamber 8 to exit via valve 17 and pipe 18 to tank 2 at ambient pressure. The higher pressure P in chamber 16 now drives piston 14 to the right and with it rod 15 and piston 9. The fluid in chamber 19 at temperature T1 is now taken almost to pressure P and forced through now open check valve 25 to pipe 26 and to pipe 13. The high pressure fluid at temperature T1 in pipe 13 is prevented from entering chamber 10 by valve 11 which is now closed. Valve 27 is now open allowing fluid 3 to enter chamber 10 at temperature T1 and ambient pressure.

Piston 9 now moves to the right until it engages spring 28 causing the valves to shift back to the position shown and again reversing the direction of piston 9, rod 15 and piston 14.

By the above action chambers 10 and 19 are alternately filled with fluid 3 at temperature T1 and ambient pressure and fluid 3 is then elevated to nominal pressure P before entering pipe 13. Simultaniously fluid 4 at temperature T2 and pressure P is released at nominally T2 and ambient pressure into tank 2 via pipe 18. This allows nominally the same effect as if fluid 4 entered a tank at pressure P and temperature T1 driving fluid at T1 and pressure P into an exit pipe.

The advantage of this invention is that the pressure transfer system 1 can be made at lower cost than a pressure tank of over a given size. The cost advantage increases dramatically as the storage tank size increases.

The action of PTM 1 is not perfect and certain inefficiencies such as fluid bypassing valves 7 and 17 during switching will occur. PTM 1 is designed to nominally pump more fluid from tank 2 than it receives from pipe 6. This is achieved by the slightly smaller displacement of chamber 8 and 19 due to the presence of rod 15. The diameter of rod 15 can be tailored to make up expensed fluid bypass and some additional difference be certain that tank 2 will not become too full, any deficiency is made up for by float valve 29 which keeps tank 2 at the desired level.

The slight difference in displacement of the driving chambers 8 and 19 versus the driven chambers 10 and 19 and frictional losses will cause the pressure in pipe 13 to be slightly less than in pipe 6. In practice this difference can be held to about 3 percent. Valve 7 is opened slightly before valve 17 and lever 22 or 23 is used to reduce the force on spring 21 or 28 that is necessary to activate switching. This helps increase efficiency and reduce output pressure variation by minimizing the activating force required on piston 14 or 9.

Figure 2:
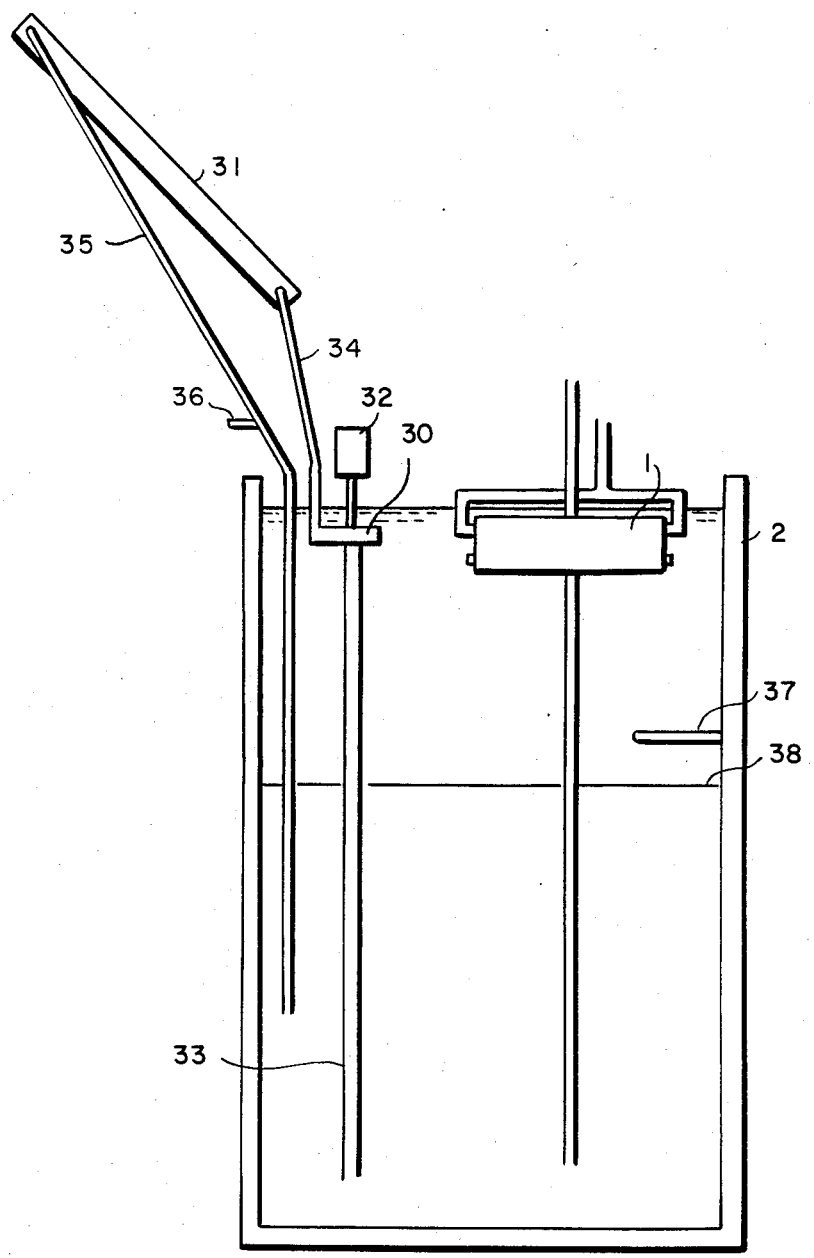
FIG. 2 shows the system modified for solar heating.

FIG. 2 shows PTM 1 and tank 2 with a solar pump 30 and solar collector 31. The use of an ambient pressure storage tank allows the implementation of a simple drainback solar system of high efficiency. The system is known as a drain back system because the fluid in the collectors, usually water, drains back to a holding tank when the system is not in operation. This prevents heat loss and possible freezing.

Solar pump 30 operated by motor 32 draws water from the lower part of tank 2 via pipe 33 and delivers it to collector 31 via pipe 34. When collector 31 is filled the water flows back to tank 2 via pipe 35. Vent 36 is placed in pipe 35 to allow air to enter for drainback when pump 30 is not operating.

In many cases it would be desirable to combine the solar storage with the back up storage. This is accomplished by allowing the bottom section of tank 2 to be heated by the solar collector and only the top section to be heated by the electric element 37 or by other means. A barrier 38 may be used to prevent undesirable mixing of the water from the top section with the water in the bottom section.

Drainback systems in conjunction with pressure tanks usually utilize a separate ambient pressure storage vessl to hold the fluid utilized in the solar loop. Heat is transferred from the solar heated fluid to the potable water via a heat exchanger. The heat exchanger being less than 100% effective raises the operating temperature of the solar collectors for a given temperature of potable water thus lowering the efficiency of solar collection.

The heat exchanger, separate tank and associated hardware significantly increase the cost and complexity of the system. Thus the system of this invention is significantly more efficient, simpler and lower in cost.

What is claimed to be new is:

1. For providing a non-pressurized reservoir in a pressurized-fluid line, the combination comprising:
   A. a vessel for containing fluid; and
   B. a fluid-driven pump including a control inlet, a control outlet, a pump inlet, and a pump outlet, the pump being operable by flow of liquid into the control inlet, through the pump, and out the control outlet to draw liquid in the pump inlet, through the pump and out the pump outlet, the control outlet and the pump inlet being disposed in communication with the interior of the vessel so that fluid that has flowed from the control inlet through the pump and out the control outlet is discharged into the vessel and that fluid thus contained in the vessel is drawn by the pump from the vessel into the pump inlet, through the pump, and out through the pump outlet, whereby pressure is effectively transmitted from the fluid at the control inlet to the fluid at the pump outlet without imposing the pressure on the fluid in the vessel.

2. The combination of claim 1 where the fluid driven pump is a double acting reciprocating device.

3. A combination as defined in claim 1 wherein the pump comprises:
   A. first and second cylinders;
   B. a piston sealingly and slidably disposed in each cylinder to divide the cylinder into variable-volume pumping and control cavities, the pistons being rigidly connected to each other so that as one piston slides to increase the volume of the pumping cavity of the cylinder in which it is disposed, the other piston slides to decrease the volume of the pumping cavity of the cylinder in which it is disposed;
   C. an inlet check valve in each cylinder providing one-way communication from the vessel to the interior of the pump cavity therein, the inlet valves in the first and second cylinders together providing the pump inlet;
   D. an outlet check valve in each cylinder providing one-way communication from the interior of the pump cavity therein to the exterior thereof to provide the pump outlet
   E. a control inlet valve means, operable alternately to assume first and second states, for directing fluid from the control inlet to the control cavity of the first cylinder when the control inlet valve means is in its first state and to the control cavity of the second cylinder when the control inlet valve means is in its second state;
   F. a control outlet valve means, operable alternately to assume first and second states, for admitting fluid into the vessel from the control cavity of the second cylinder when the control outlet valve means is in its first state and from the control cavity of the first cylinder when the control outlet valve means is in its second state; and
   G. means for operating the control inlet and outlet valve means to their respective first states when the pistons have reached a predetermined first position, in which the pumping cavity of the first cylinder has reached a first, relatively high predetermined volume and the pumping cavity of the second cylinder has reached a relatively low volume and for operating the control inlet and outlet valves to their respective second states when the pistons have reached a predetermined second position, in which the pumping cavity of the first cylinder has reached a second, relatively low predetermined volume and the pumping cavity of the second cylinder has reached a relatively high volume.

4. A combination as defined in claim 3 wherein:
   A. the control outlet valve means comprises a poppet valve in the control cavity of each of said first and second cylinders, the poppet valve in the control cavity of the first cylinder being held closed by fluid pressure to prevent fluid from flowing from the control cavity of the first cylinder when the control outlet valve means is in its first state and being open to admit fluid from the control cavity of the first cylinder into the vessel when the control outlet valve means is in its second state, the poppet valve in the control cavity of the second cylinder being open to admit fluid from the control cavity of the second cylinder into the vessel when the control outlet valve means is in its first state and being held closed by fluid pressure to prevent fluid from flowing from the control cavity of the second cylinder into the vessel when the control outlet valve means is in its second state; and
   B. the means for operating the control inlet and outlet valve means includes a spring acting between each piston and one of the poppet valves and storing enough energy to change the state of its associated valve completely once the valve poppet has begun its state change.

5. A combination as defined in claim 4 further including a magnet so positioned with respect to each poppet valve as to tend to retain the valve in its closed position so that the spring stores more energy before moving the poppet valve than it would in the absence of the magnet.

6. A combination as defined in claim 3 wherein the means for operating the control inlet and outlet valve means changes the state of one of the control inlet and outlet valve means before it changes the state of the other and thereby minimizes the total force required to change the state of the control inlet and outlet valve means.

7. A combination as defined in claim 3 wherein:
   A. the vessel is adapted to contain a liquid; and B. the combination further includes a float valve for admitting liquid from the control inlet directly into the vessel without flowing through the pump when the liquid level in the vessel is higher than a predetermined maximum level but for preventing liquid from flowing directly to the vessel without flowing through the pump when the liquid level in the vessel is below the predetermined maximum level.

8. A combination as defined in claim 3 further including means for heating the fluid in the vessel.

9. A combination as defined in claim 1 wherein the vessel is unpressurized so that substantially the entire pressure difference across the vessel walls is that caused by the weight of the fluid contained in the vessel.

10. A combination as defined in claim 9 further including means for heating the fluid in the vessel.

11. A combination as defined in claim 1 further including means for heating the fluid in the vessel.

12. The device of claim 3 where the useful displacement of the pumping cavities is larger than the useful displacement of the control cavities.

* * * * *